Sept. 17, 1935.  J. EKISLER  2,015,006

PROCESS OF MAKING STORAGE BATTERY SEPARATORS

Filed Nov. 9, 1933

J. Ekisler
INVENTOR

By: Marks & Clark
ATTYS.

Patented Sept. 17, 1935

2,015,006

UNITED STATES PATENT OFFICE 2,015,006

PROCESS OF MAKING STORAGE BATTERY SEPARATORS

Jean Ekisler, Paris, France, assignor to Maurice Pagenel, Paris, France

Application November 9, 1933, Serial No. 697,342 In France October 4, 1933

1 Claim. (Cl. 136—148)

The present invention relates to a separator for storage batteries, and its object is to provide a separator which has a great porosity and will not be attacked by the electrolyte, permitting to place the battery plates at a very short distance apart, having a duration of service which is much greater than for the known separators, and serving at the same time to increase the duration of the storage battery plates. The invention further relates to the process for the manufacture of such separators.

It has already been proposed to employ separators consisting of very thin sheets of wood (of about 0.1 mm. thickness) which are specially treated in order to render them porous and unaffected by the electrolyte. However, these separators, when placed in contact with the positive plate, are rapidly destroyed by the oxidizing action of the electrolyte, which action occurs near this positive plate. It is found that they fall away in the shape of fine particles after a short time.

The separators in conformity with the invention comprise a sheet formed by the superposition of several very thin layers or sheets of filaments of drawn or spun glass, these filaments being placed together in the practically parallel position and caused to adhere together in various places by the aid of a suitable binding material; the sheet thus obtained has a great porosity.

In order to manufacture these separators, the operator takes up a set of the drawn glass threads or filaments and spreads them over a flat surface, taking advantage of the adhesion or the mutual attraction between the threads, and operating in such manner that the threads will be practically parallel and that the layer will contain, as far as possible, only a single thread in its thickness. Then, above the said layer is projected a cloud of a binding liquid, which becomes deposited upon the layer and which, after drying, assures the mutual connection of the threads and an infinite number of small points of adhesion which are relatively at a considerable distance apart. In order to subsequently connect together several layers of thread thus prepared, the binding substance is projected in the aforesaid manner upon the surface of each layer, which is then covered by the next layer, this latter having a sufficient cohesion, due to the binding material, to allow it to be handled. It is then simply necessary to cut out the resulting sheet to the size of the separators. Due to this process the threads may be distributed in a very uniform manner, and their mutual connection is assured, whereby a sheet having a sufficient strength, while at the same time maintaining the maximum degree of porosity, is obtained.

The invention further relates to storage batteries provided with the above-mentioned separators. It is preferable, in general, to combine these extremely porous separators with the separators made of wood or the other convenient material, these latter being very effective in preventing the movement of metallic particles from one battery plate to the other. In this case, the sheet of drawn glass is interposed between the positive plate and the wood separator, and protects the latter against oxidation.

As shown in drawing, 1, 2, 3, 4 etc. represent the succesive layers of glass threads, which threads are practically parallel with one another in each layer. The small points indicated at 5 represent diagrammatically the dropping points of the cloud of binding liquid which is projected above the unit sheets of threads 1, 2, 3, 4 during the manufacture, and these points represent points of adhesion which assure a substantial construction of the whole, without interfering with the porosity.

Figure 1:
Fig. 1 is a diagrammatic cross-section, on a very large scale, of a separator in conformity with the invention.
Figure 2:
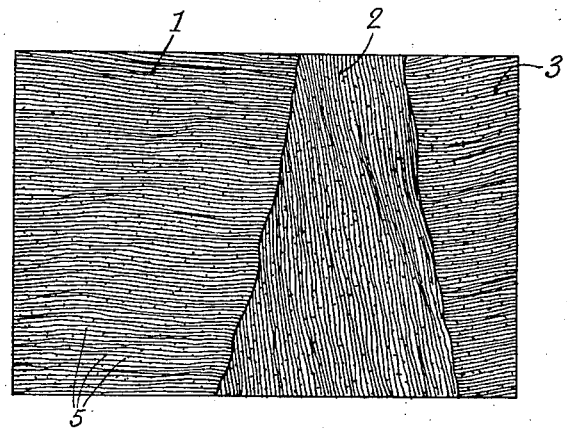
Fig. 2 is a diagrammatic plan view of the separator, with parts of the outer layers broken away.

The threads of each layer may be inclined of any desired angle with respect to the threads of the adjacent layers. In the example shown in Figs. 1 and 2 of the drawing, it has been supposed that the threads of each layer are perpendicular to the threads of the next layer, and this provide a structure analogous to that of laminated wood. This arrangement assures the maximum mechanical strength and rigidity.

Figure 4:
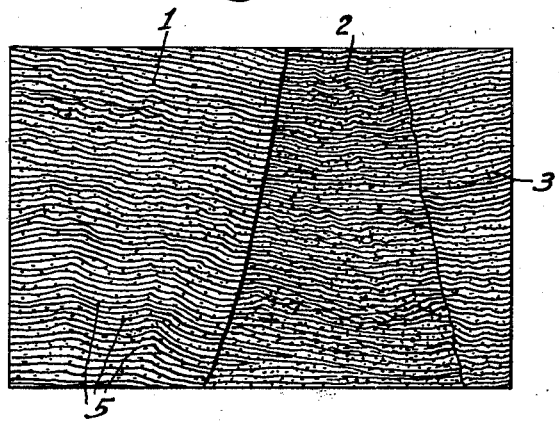
Fig. 4 is a view, analogous to Fig. 2 showing another arrangement of the separator.

On the contrary, if it is desired to obtain flexible sheets, which may be wound parallel with the direction of the threads, about the plates of the storage battery, such disposition will be adopted that the threads of all of the layers are parallel as shown in Fig. 4.

Figure 3:
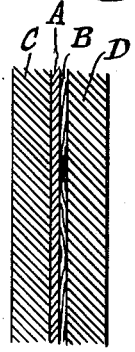
Fig. 3 is a diagrammatic section of an element of a storage battery, provided with a separator according to the invention.

Fig. 3 shows at A the above described separator whose thickness is about 0.5 mm.; at B a wood separator of the known type whose thickness is about 0.1 mm., and at C and D the positive and negative plates, respectively.

Due to this arrangement the battery plates may be brought very near together (with a space of about 0.6 mm.) and thus to reduce the internal resistance of the battery and hence to increase the maximum current which the battery will furnish. However, the device prevents all danger of an internal short-circuit, even after a long period of use, as on the one hand the drawn glass separator, which is pressed against the positive plate, prevents the active material from being detached from this plate, and on the other hand, the wood separator prevents all movement of particles of metal or of metallic salts. Moreover, the wood separator is kept at a sufficient distance from the positive plate C in order that it will be removed from the destructive oxidizing action of the ions accumulated near this plate C. Furthermore, the drawn glass separator is not attacked by the electrolyte and has a great strength, especially against shocks. This latter property is a valuable feature for batteries used with motor car starters.

Owing to the great porosity of the drawn glass separator (the proportion of the gaps being 85 to 90 per cent of the volume) the circulation of the electrolyte is not hindered.

On the other hand, the perfect homogeneity of the separator permits the best use of the total capacity of the battery, and due to the uniform thickness of said separator the active material is effectively maintained upon the plates.

The binding substance herein employed may consist of any material which is not acted upon by the electrolyte, such as a gelatine, starch, india rubber, bakelite, etc.

The diameter of the glass threads or filaments is about 0.03 mm., and thus, in order to obtain a separator of 0.5 mm. thickness, about twenty unit layers will be superposed.

Obviously, the use of the separator B made of wood or other convenient material is optional, and good result may be obtained by the sole use of a drawn glass separator.

Having now described my invention what I claim as new and desire to secure by Letters Patent is:

A process of manufacturing separators for storage batteries, which consists in spreading a set of substantially parallel threads of drawn glass upon a surface to form a thin layer, in projecting a cloud of a binding substance above said layer, in allowing the drying of the minute drops of said substance which have been deposited on said layer and in successively superposing several layers with interposition of a binding substance, applied under the form of a cloud, between two adjacent layers.

JEAN EKISLER.